United States Patent
Na

(10) Patent No.: US 8,836,312 B2
(45) Date of Patent: *Sep. 16, 2014

(54) SWITCHING MODE POWER SUPPLY APPARATUS AND POWER SUPPLY METHOD THEREOF

(75) Inventor: Tae-kwon Na, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,729

(22) Filed: Sep. 10, 2012

(65) Prior Publication Data

US 2013/0003239 A1  Jan. 3, 2013

Related U.S. Application Data

(63) Continuation of application No. 13/067,664, filed on Jun. 17, 2011, now Pat. No. 8,283,909, which is a continuation of application No. 12/105,519, filed on Apr. 18, 2008, now Pat. No. 7,986,136.

(30) Foreign Application Priority Data

Aug. 9, 2007 (KR) ........................ 10-2007-0080035

(51) Int. Cl.
*G05F 1/67* (2006.01)
*G05F 1/569* (2006.01)

(52) U.S. Cl.
USPC .............................. 323/299; 323/276; 361/18

(58) Field of Classification Search
USPC ........ 323/266, 282, 299, 908; 361/18, 79, 86, 361/91.1
See application file for complete search history.

(56) References Cited

U.S. PATENT DOCUMENTS

| 4,882,782 A | 11/1989 | Kimizuka et al. |
| 5,625,285 A | 4/1997 | Virgillo |
| 6,304,472 B1 * | 10/2001 | Nagasu et al. ................. 363/97 |

(Continued)

FOREIGN PATENT DOCUMENTS

| JP | 2001-161065 | 6/2001 |
| KR | 1998-042929 | 9/1998 |
| KR | 1999-0052422 | 7/1999 |
| KR | 10-0721161 | 5/2007 |

OTHER PUBLICATIONS

Office Action dated Oct. 10, 2011 in parent U.S. Appl. No. 13/067,664.

(Continued)

*Primary Examiner* — Jessica Han
(74) *Attorney, Agent, or Firm* — Staas & Halsey LLP

(57) ABSTRACT

A switching mode power supply apparatus includes a conversion unit to convert input power into output power having a predetermined voltage by performing a switching operation, a light emitting unit to emit light if the voltage of the output power exceeds a predetermined threshold voltage, a light receiving unit to receive the light emitted from the light emitting unit and output a signal indicative of the voltage of the output power, a switching controller to control the switching operation of the conversion unit according to the voltage of the output power indicated by the signal output from the light receiving unit, and a disconnection unit to disconnect power applied to the light receiving unit if a voltage of the power applied to the light receiving unit exceeds a predetermined trigger voltage.

11 Claims, 6 Drawing Sheets

(56) References Cited

U.S. PATENT DOCUMENTS

| | | | |
|---|---|---|---|
| 6,574,126 B1 | 6/2003 | Gionet, Jr. | |
| 6,577,478 B2 | 6/2003 | Kim et al. | |
| 6,700,766 B2 | 3/2004 | Sato | |
| 6,992,467 B1 | 1/2006 | Fey | |
| 6,999,290 B1 | 2/2006 | Takikawa et al. | |
| 7,440,295 B2 | 10/2008 | Na | |
| 7,986,136 B2 | 7/2011 | Na | |
| 8,283,909 B2 * | 10/2012 | Na | 323/299 |
| 2007/0257645 A1 * | 11/2007 | Nishino | 323/276 |
| 2009/0046483 A1 | 2/2009 | Na | |

OTHER PUBLICATIONS

Chinese Office Action issued Jul. 13, 2012 in corresponding Chinese Patent Application 2008101364262.

Notice of Allowance dated Jun. 4, 2012 in parent U.S. Appl. No. 13/067,664.

Notice of Allowance dated Mar. 17, 2011 in grandparent U.S. Appl. No. 12/105,519.

Office Action dated Nov. 23, 2011 in grandparent U.S. Appl. No. 12/105,519.

Korean Notice of Allowance mailed Jan. 15, 2013 for corresponding Korean Application No. 10-2008-0051094.

* cited by examiner

SWITCHING MODE POWER SUPPLY APPARATUS AND POWER SUPPLY METHOD THEREOF

CROSS-REFERENCE TO RELATED APPLICATION

This application is a continuation of U.S. application Ser. No. 13/067,664 that is a Continuation Application of U.S. application Ser. No. 12/105,519, which is patented as U.S. Pat. No. 7,086,136, and claims the benefit of Korean Patent Application No. 2007-80035, filed on Aug. 9, 2007 in the Korean Intellectual Property Office, the disclosures of which are incorporated herein by reference.

BACKGROUND OF THE INVENTION

1. Field of the Invention

Aspects of the invention relate to a switching mode power supply apparatus and a power supply method thereof, and more particularly to a switching mode power supply apparatus that detects a voltage of power applied to a light receiving unit and a power supply method thereof.

2. Related Art

A switching mode power supply apparatus rectifies AC power received from an external power source to obtain DC power, converts the DC power into AC power by performing a switching operation, changes a voltage of the AC power using a transformer, and rectifies and smoothes the transformed AC power, thereby outputting smoothed DC power. The foregoing process is widely used because it decreases power loss and heat generation compared to a linear power supply apparatus that converts AC power into DC power using a passive element, such as a voltage-dividing resistor.

Referring to FIG. 1A, a switching mode power supply apparatus 1 according to the related art includes a conversion unit 2 that converts input power into output power having a predetermined voltage by performing a switching operation. An output unit 3 outputs the output power to an external device (not shown). A light emitting unit 4 emits light if the voltage of the output power exceeds a predetermined threshold voltage. A light receiving unit 5 receives light from the light emitting unit 4 and outputs a signal indicative of the voltage of the output power. A switching controller 6 controls the switching operation of the conversion unit 2 according to the voltage of the output power indicated by the signal output from the light receiving unit 5.

FIG. 1B is a detailed circuit diagram of a portion of the switching mode power supply apparatus 1 of FIG. 1A according to the related art. External AC power (e.g., an AC voltage of 220 V) is applied to a drain terminal of a metal-oxide semiconductor field effect transistor (MOSFET), a pulse-width modulated signal is generated based on the voltage of the output power indicated by the signal output from the light receiving unit 5 that is applied to a feedback (FB) terminal of the switching controller 6, and the pulse-width modulated signal is output from an output (OUT) terminal of the switching controller 6 and applied to a gate terminal of the MOSFET.

However, if an excessive voltage is applied to the light receiving unit 5 in an abnormal situation (e.g., when a short circuit occurs between the drain terminal of the MOSFET and the FB terminal of the switching controller 6), insulation between the light emitting unit 4 and the light receiving unit 5 may be destroyed. Such an abnormal situation is more likely to occur when the MOSFET and the switching controller 6 are integrated in a single device. If the insulation is destroyed, a voltage applied to the light emitting unit 4 will be transmitted to the light receiving unit 5, which may injure a user.

SUMMARY OF THE INVENTION

Accordingly, an aspect of the invention is to provide a switching mode power supply apparatus that prevents an excessive voltage from being applied to a light receiving unit in an abnormal situation to prevent injury to a user, and a power supply method thereof.

According to an aspect of the invention, a switching mode power supply apparatus includes a conversion unit to convert input power into output power having a predetermined voltage; a light emitting unit to emit light if the voltage of the output power exceeds a predetermined threshold voltage; a light receiving unit to receive the light emitted from the light emitting unit and output a signal indicative of the voltage of the output power; a switching controller to control the switching operation of the conversion unit according to the voltage of the output power indicated by the signal output from the light receiving unit; and a disconnection unit to disconnect power applied to the light receiving unit if the voltage of the power applied to the light receiving unit exceeds a predetermined trigger value.

According to an aspect of the invention, the disconnection unit may include a Zener diode through which a current flows if the voltage of the power applied to the light receiving unit exceeds the predetermined threshold value; and a fusible element that is opened by the current flowing through the Zener diode.

According to an aspect of the invention, the disconnection unit may further include a switching unit that turns on if the voltage of the power applied to the light receiving unit exceeds the predetermined trigger voltage to increase a current flowing through the fusible element.

According to an aspect of the invention, the fusible element may comprise a fuse or a fusible resistor.

According to an aspect of the invention, a power supply method of a switching mode power supply apparatus includes converting input power into output power having a predetermined voltage by performing a switching operation; emitting light from a light emitting unit if the voltage of the output power exceeds a predetermined threshold voltage; receiving the light emitted from the light emitting unit with a light receiving unit that outputs a signal indicative of the voltage of the output power; determining whether a voltage of power applied to the light receiving unit exceeds a predetermined trigger voltage; and disconnecting the power applied to the light receiving unit if the voltage of the power applied to the light receiving unit exceeds the predetermined trigger voltage.

According to an aspect of the invention, the disconnecting of the power may include disconnecting the power using a Zener diode through which a current flows if the voltage of the power applied to the light emitting unit exceeds the predetermined trigger voltage; and a fusible element that is opened by the current flowing through the Zener diode.

According to an aspect of the invention, the disconnecting of the power may further include using a switching unit that turns on if the voltage of the power applied to the light receiving unit exceeds the predetermined trigger voltage to increase a current flowing through the fusible element.

According to an aspect of the invention, the fusible element may include a fuse or a fusible resistor.

According to an aspect of the invention, a disconnection unit is provided for a switching mode power supply apparatus that includes a switching controller to control a voltage of an output power of the switching mode power supply apparatus by controlling a switching operation of the switching mode power supply apparatus according to a signal indicative of the voltage of the output power that is input to a feedback terminal of the switching controller; and a light receiving unit to output the signal indicative of the voltage of the output power that is input to the feedback terminal, the disconnection unit connecting the light receiving unit to the feedback terminal to enable the signal indicative of the voltage of the output power to be input to the feedback terminal during a normal operation of the switching mode power supply apparatus, and disconnecting the light receiving unit from the feedback terminal if a voltage applied to the light receiving unit by the feedback terminal exceeds a predetermined trigger voltage.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which.

DETAILED DESCRIPTION OF THE EMBODIMENTS

Figure 1A:
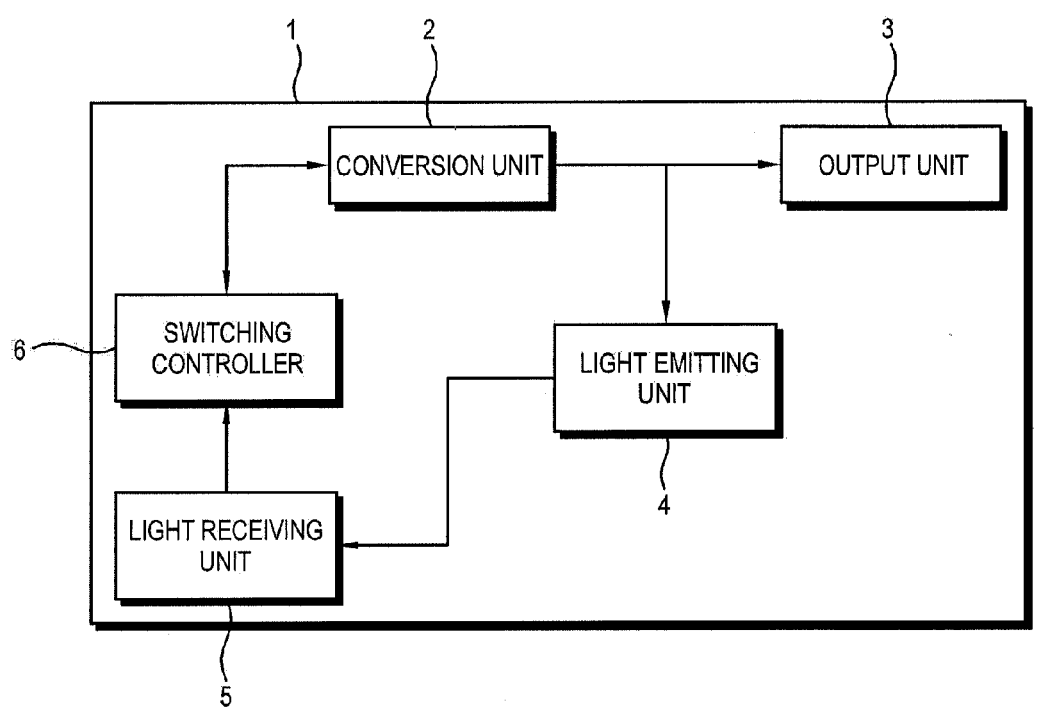
FIG. 1A is a block diagram of a switching mode power supply apparatus according to the related art.
Figure 1B:
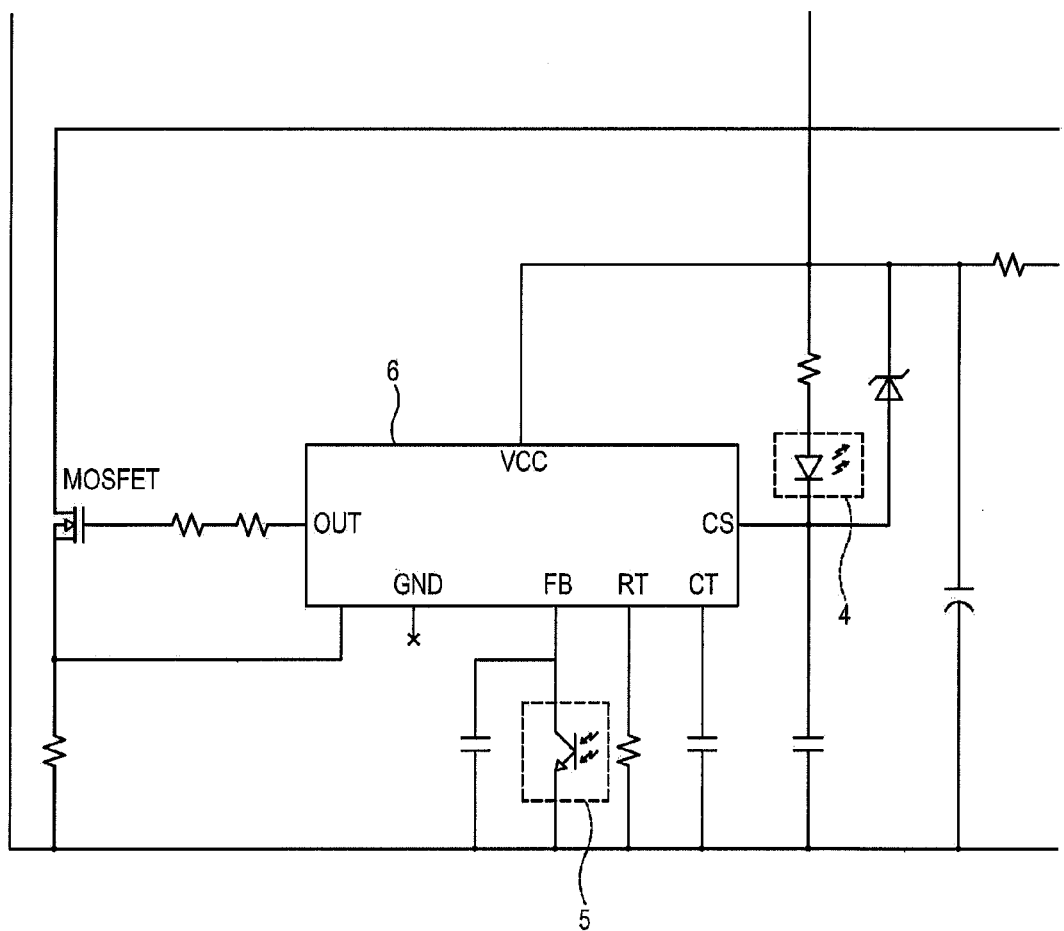
FIG. 1B is a detailed circuit diagram of a portion of the switching mode power supply apparatus of FIG. 1A according to the related art.

Reference will now be made in detail to embodiments of the invention, examples of which are illustrated in the accompanying drawings, wherein like reference numerals refer to like elements throughout. The embodiments are described below in order to explain the invention by referring to the figures.

Figure 2:
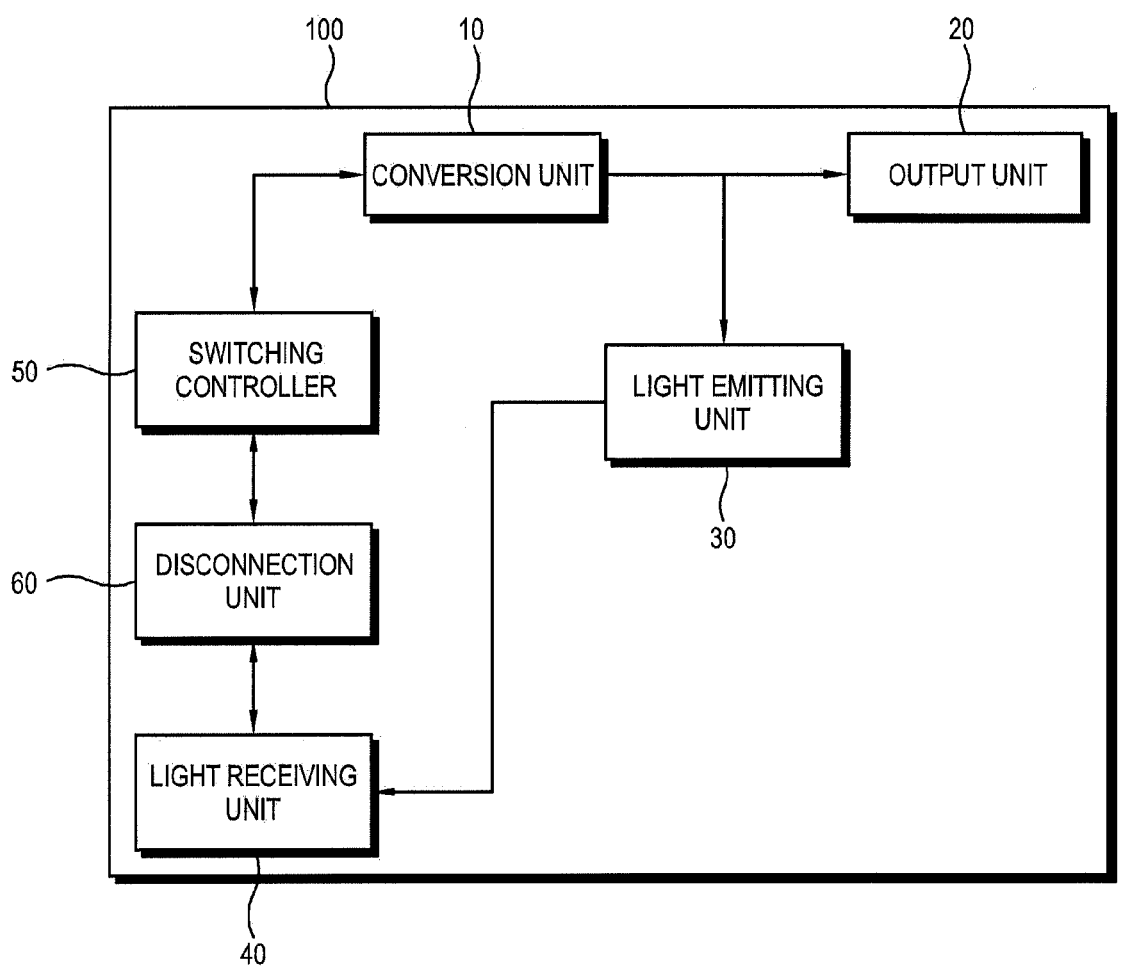
FIG. 2 is a block diagram of a switching mode power supply apparatus according to an aspect of the invention.

Referring to FIG. 2, a switching mode power supply apparatus 100 according to an aspect of the invention includes a conversion unit 10, an output unit 20, a light emitting unit 30, a light receiving unit 40, a switching controller 50, and a disconnection unit 60. The conversion unit 10 transforms input power into output power having a predetermined voltage, and includes a transformer (not shown) having a primary coil and a secondary coil. The input power, which is AC power received from an external power source (not shown), is rectified by a rectifier unit (not shown), the rectified power is converted to AC power by a switching unit (not shown) under control of the switching controller 50, and the converted AC power is applied across the primary coil of the transformer of the conversion unit 10.

AC power is induced in the secondary coil of the transformer of the conversion unit 10 according to a turns ratio of the primary coil and the secondary coil, and the induced AC power is converted into DC output power via a diode (not shown) and a smoothing capacitor (not shown). However, it is understood that the conversion unit 10 may have configurations other than that described above. For example, the transformer may be omitted. Many such configurations are known in the art, and therefore will not be described here. Also, although the conversion unit 10 has been described above as converting AC input power into DC output power, the conversion unit 10 may also convert AC input power into AC output power, or DC input power into AC output power, or DC input power into DC output power.

The output unit 20 outputs the DC output power from the conversion unit 10 to an external device (not shown).

The light emitting unit 30 emits light if a voltage of the output power applied to the output unit 20 exceeds a predetermined threshold voltage. The light receiving unit 40 receives the light from the light emitting unit 30, and outputs a signal indicative of the voltage of the output power to the switching controller 50. While not required in all aspects, the light emitting unit 30 and the light receiving unit 40 may be integrated in a single chip in which they are insulated from each other to electrically isolate the circuit to which the light emitting unit 30 is connected from the circuit to which the light receiving unit 40 is connected. Such a chip is known, for example, as a photocoupler, an optocoupler, or an opto-isolator.

The switching controller 50 controls a switching operation of the switching unit (not shown) of the conversion unit 10 according to the voltage of the output power indicated by the signal output from the light receiving unit 40 by applying a pulse-width modulated signal to the switching unit (not shown) of the conversion unit 10 to adjust the voltage of the output power output from the conversion unit 10. The AC input power is input not only to the conversion unit 10, but is also input to a Vcc terminal of the switching controller 50 through a smoothing capacitor and a start-up resistor (see FIGS. 3A and 3B) to enable the switching controller 50 to operate during a start-up operation. A Zener diode (see FIGS. 3A and 3B) connected between the Vcc terminal and a CS terminal of the switching controller 50 limits a voltage applied to the Vcc terminal to a Zener voltage of the Zener diode.

The disconnection unit 60 disconnects the light receiving unit 40 from the switching controller 50 if a voltage applied to the light receiving unit 40 exceeds a predetermined trigger voltage. The operation of the disconnection unit 60 according to aspects of the invention will be explained in detail with reference to FIGS. 3A and 3B.

Figure 3A:
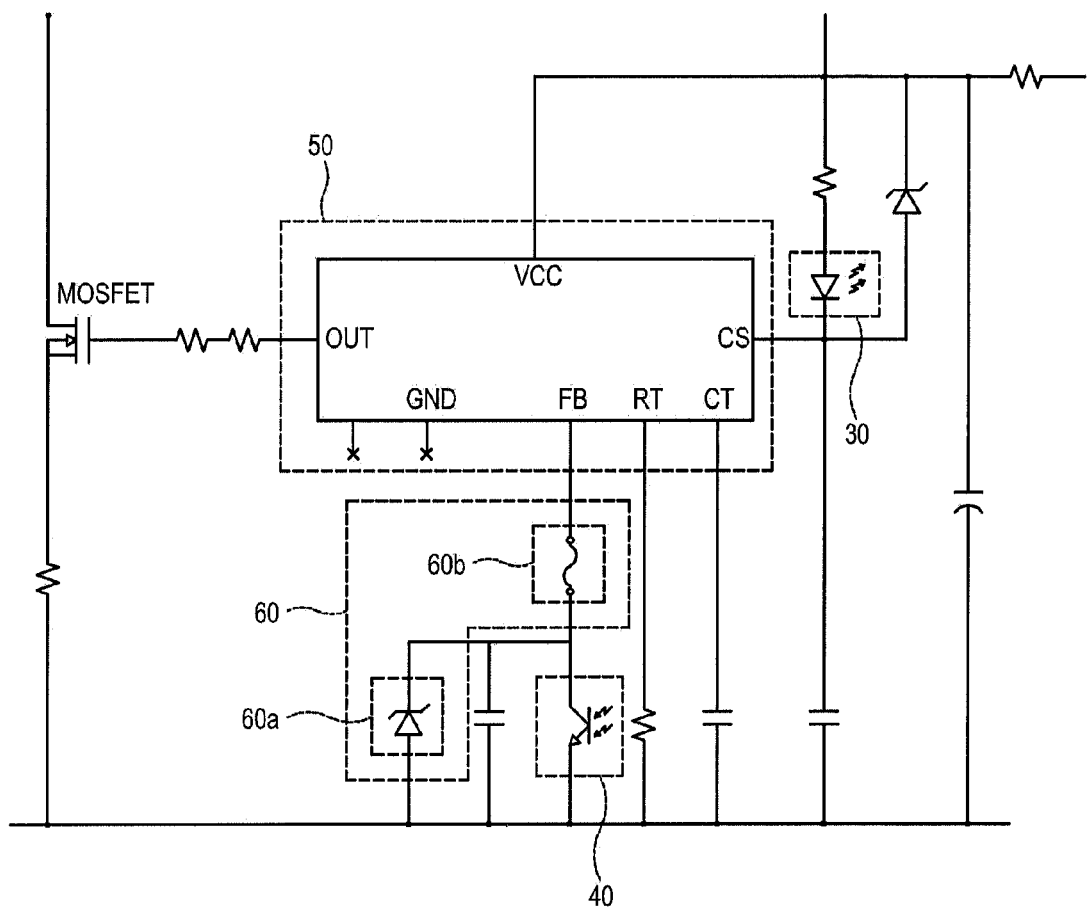
FIG. 3A is a detailed circuit diagram of a portion of the switching mode power supply apparatus of FIG. 2 according to an aspect of the invention.

Referring to FIG. 3A, a disconnection unit 60 of a switching mode power supply apparatus 100 according to an aspect of the invention includes a fusible resistor 60*b* connected between a feedback (F8) terminal of the switching controller 50 and the light receiving unit 40, and a Zener diode 60*a* connected between ground and the junction between the fusible resistor 60*b* and the light receiving unit 40. However, it is understood that a fuse or any other fusible element may be used instead of the fusible resistor 60*b*.

If an abnormal situation occurs (e.g., when a short circuit occurs between a drain terminal of a MOSFET and the feedback (F8) terminal of the switching controller 50), a voltage applied to the feedback (F8) terminal exceeds the Zener voltage of the Zener diode 60*a*, causing a current to flow from the feedback (F8) terminal to ground through the fusible resistor 60*b* and the Zener diode 60*a*. This current exceeds a rated current of the fusible resistor 60b, causing the fusible resistor 60b to open and disconnect the light receiving unit 40 from the feedback (F8) terminal of the switching controller 50. Accordingly, an excessive voltage is prevented from being applied to the light receiving unit 40 from the feedback (F8) terminal of the switching controller 50, thereby preventing insulation between the light emitting unit 30 and the light receiving unit 40 from being destroyed. Here, a predetermined trigger voltage of the disconnection unit 60 is the Zener voltage of the Zener diode 60a. However, it is understood that any other voltage breakdown element that conducts current when a voltage across it exceeds a predetermined trigger voltage may be used in place of the Zener diode 60a.

Figure 3B:
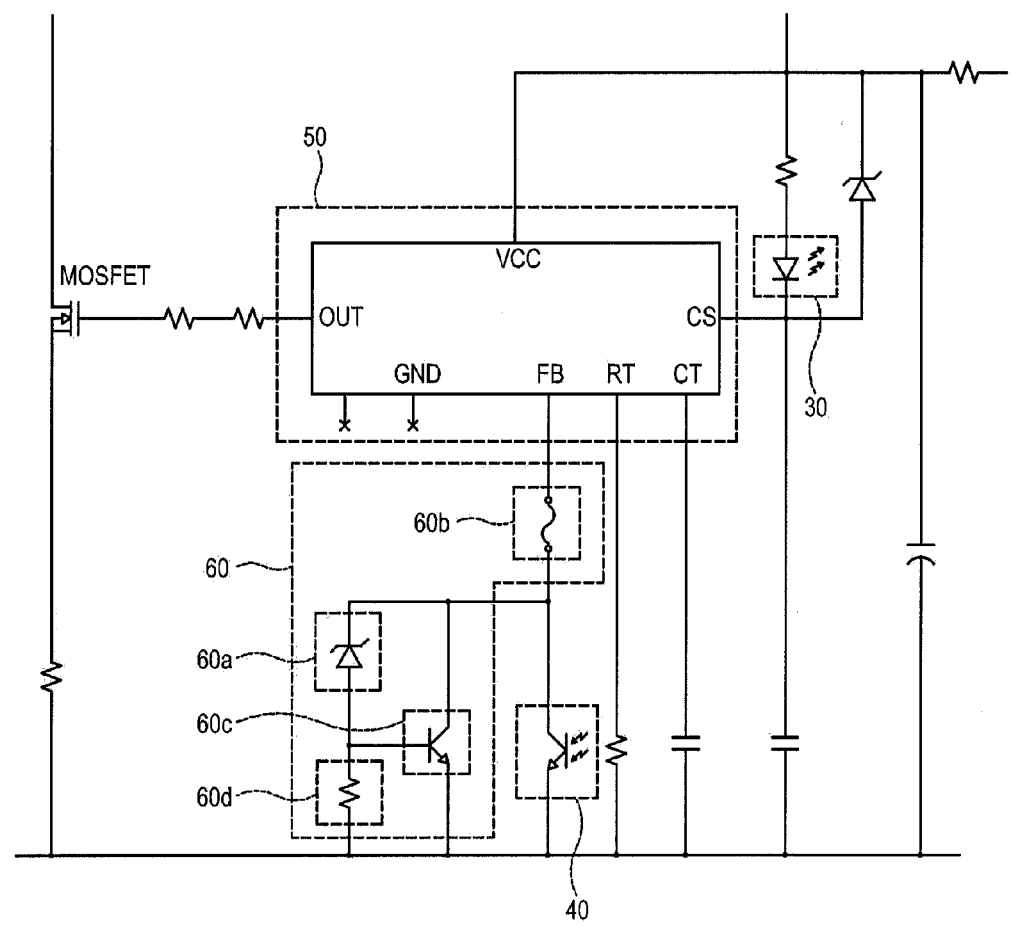
FIG. 3B is a detailed circuit diagram of a portion of the switching mode power supply apparatus of FIG. 2 according to an aspect of the invention.

Alternatively, referring to FIG. 3B, a disconnection unit 60 of a switching mode power supply apparatus 100 according to another aspect of the invention may further include a switching unit 60c, such as a transistor, connected between ground and the junction between the fusible element 60b and the light receiving unit 40, and a resistor 60d connected between ground and the Zener diode 60a. A control terminal of the switching unit 60c, such as a gate electrode of a transistor, is connected to the junction between the Zener diode 60a and the resistor 60d. However, it is understood that any other switching unit having a control terminal may be used instead of the transistor shown in FIG. 3B. Also, it is understood that additional circuit components, such as resistors and capacitors, may be included in the disconnection unit 60 to control the operation of the switching unit 60c.

If an abnormal situation occurs, e.g., when a short circuit occurs between the drain terminal of the MOSFET and the feedback (FB) terminal of the switching controller 50, a voltage applied to the feedback (FB) terminal exceeds the Zener voltage of the Zener diode 60a, causing a current to flow from the feedback (FB) terminal to ground through the fusible resistor 60b, the Zener diode 60a, and the resistor 60d. The current flowing through the resistor 60d creates a voltage drop across the resistor 60d, which increases a voltage applied to the control terminal of the switching unit 60c above a turn-on voltage of the switching unit 60c, which turns on the switching unit 60c, which connects one end of the fusible resistor 60b substantially to ground, thereby increasing a current flowing through the fusible resistor 60b above the rated current of the fusible resistor 60b, thereby causing the fusible resistor 60b to open more quickly than in the aspect of the invention shown in FIG. 3A Accordingly, insulation between the light emitting unit 30 and the light receiving unit 40 is prevented from being destroyed, thereby preventing an accident in an abnormal situation. Here, like in the aspect of the invention shown in FIG. 3A, a predetermined trigger voltage of the disconnection unit 60 is the Zener voltage of the Zener diode 60a.

If an abnormal situation occurs in the switching mode power supply apparatus 1 according to the related art, insulation between the light emitting unit 4 and the light receiving unit 5 may be destroyed when a voltage of 500 V is applied to the light receiving unit 5. However, in the switching mode power supply apparatus 100 according to aspects of the invention, tests have shown that insulation between the light emitting unit 30 and the light receiving unit 40 will not be destroyed when a voltage of 3000 V or more is applied to the light emitting unit 40.

Figure 4:
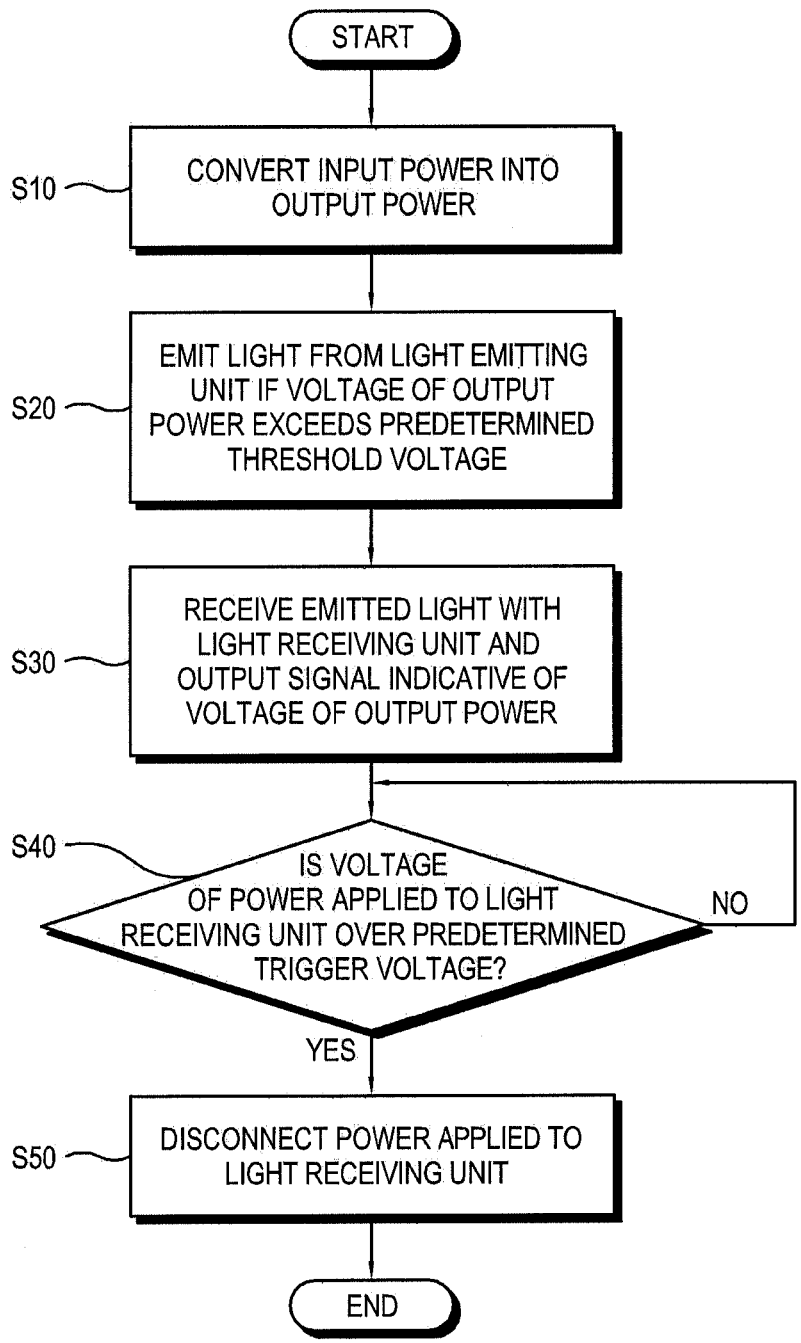
FIG. 4 is a flow chart of a power supply method of a switching mode power supply apparatus according to an aspect of the invention.

A power supply method of the switching mode power supply apparatus 100 according to an aspect of the invention will now be described with reference to FIG. 4.

First, input power is converted into output power having a predetermined voltage (510). If the voltage of the converted output power at 510 exceeds a predetermined threshold voltage, the light emitting unit 30 emits light (520).

Then, the light receiving unit 40 receives the light emitted at 520 and outputs a signal indicative of the voltage of the output power (530).

If the voltage of power applied to the light receiving unit 40 is over a predetermined trigger voltage (540), the power applied to the light receiving unit 40 is disconnected (550). Otherwise, the operation 540 is repeated.

In the operation 550, if the voltage of the power applied to the light receiving unit 40 is over the predetermined trigger voltage in the operation 540, the power applied to the light receiving unit 40 may be disconnected using the flowing Zener diode 60a and the fusible resistor 60b that is opened by the current flowing through the Zener diode 60a, and possibly using the switching unit 60c and the resistor 60d to increase the current flowing through the fusible resistor 60b to open it more quickly.

As described above, a switching mode power supply apparatus and a power supply method thereof according to aspects of the invention prevent injury to a user caused by damage to the switching mode power supply apparatus caused by an abnormal situation in which an excessive voltage is applied to a light receiving unit.

Although several embodiments of the invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising a power supply for protection of insulation, the power supply comprising:
   a conversion unit to convert input power into output power having a predetermined voltage;
   an emitting unit to output an emittance upon the voltage of the output power exceeding a threshold voltage;
   a receiving unit to receive the emittance output from the emitting unit and output a signal indicative of the voltage of the output power;
   a controller to control an operation of the conversion unit based on the output signal from the receiving unit; and
   a disconnection unit to disconnect power applied to the receiving unit if a voltage of the power applied to the receiving unit exceeds a trigger voltage,
   wherein the disconnection unit comprises a switch turned on based on the voltage of power applied to a terminal of the controller detected by a detector and making one end of a fusible element be grounded so that the fusible element is opened to protect insulation in the apparatus.

2. The apparatus according to claim 1, wherein the disconnection unit comprises the detector to detect a voltage of power applied to the terminal of the controller.

3. The apparatus according to claim 2, wherein the disconnection unit further comprises:
   a Zener diode through which a current flows if the voltage of the power applied to the receiving unit exceeds the trigger voltage; and
   the fusible element that is opened by the current flowing through the Zener diode.

4. The apparatus according to claim 2, wherein the fusible element comprises a fuse or a fusible resistor.

5. The apparatus according to claim 2, wherein the trigger voltage is a Zener voltage of the Zener diode.

6. The apparatus according to claim 1, wherein the disconnection unit further comprises a resistor to increase a voltage applied to a control terminal of the switch above a turn-on voltage of the switch and turn on the switch.

7. The apparatus according to claim 1, wherein the insulation is between the emitting unit and the receiving unit.

8. A method for protection of insulation in an apparatus, comprising:
   converting input power into output power having a predetermined voltage;
   outputting an emittance upon the voltage of the output power exceeding a threshold voltage;
   receiving the emittance output and outputting a signal indicative of the voltage of the output power;
   controlling an operation based on the output signal; and
   disconnecting power applied if a voltage of the power applied exceeds a trigger voltage, wherein the disconnecting comprises:
   detecting a voltage of power applied to a terminal of the controller, and
   turning on a switch based on the voltage of power applied to the terminal of the controller and making one end of a fusible element be grounded so that the fusible element is opened to protect insulation in the apparatus.

9. The method according to claim 8, wherein the turning on the switch comprises increasing a voltage applied to a control terminal of the switch above a turn-on voltage of the switch by a resistor.

10. The method according to claim 8, wherein the fusible element comprises a fuse or a fusible resistor.

11. The method according to claim 8, wherein the trigger voltage is a Zener voltage of a Zener diode.

* * * * *